United States Patent

[11] 3,587,129

| [72] | Inventor | Roy E. Linker<br>Nursery Road, |
|---|---|---|
| [21] | Appl. No. | Titusville, N.J.<br>780,612 |
| [22] | Filed | Nov. 4, 1968 |
| [45] | Patented | June 28, 1971<br>Continuation-in-part of application Ser. No.<br>573,109, Aug. 17, 1966, now Patent No.<br>3,408,678. |

[54] ELECTRICALLY HEATED WINDSHIELD WIPER ASSEMBLY
9 Claims, 13 Drawing Figs.

[52] U.S. Cl. .................................................... 15/250.06
[51] Int. Cl. .................................................... B60s 1/04,
A47l 1/16
[50] Field of Search ........................................... 15/250.05-
—250.09, 250.42; 219/203

[56] References Cited
UNITED STATES PATENTS

| 3,097,389 | 7/1963 | Contant et al. | 15/250.42 |
| 3,408,678 | 11/1968 | Linker | 15/250.05 |
| 3,419,932 | 1/1969 | Linker | 15/250.06 |

*Primary Examiner*—Peter Feldman
*Attorney*—Sperry and Zoda

ABSTRACT: A windshield wiper assembly embodying a heated wiper blade is provided with members for mounting and actuating the wiper blade and for supplying current to an electrical resistance element which serves to raise the temperature of the wiper blade. The electrical circuit includes separable connections between the heating element of the wiper blade and a source of electrical current, whereby the wiper blade and the mounting members may be readily assembled or disconnected for replacement or repair.

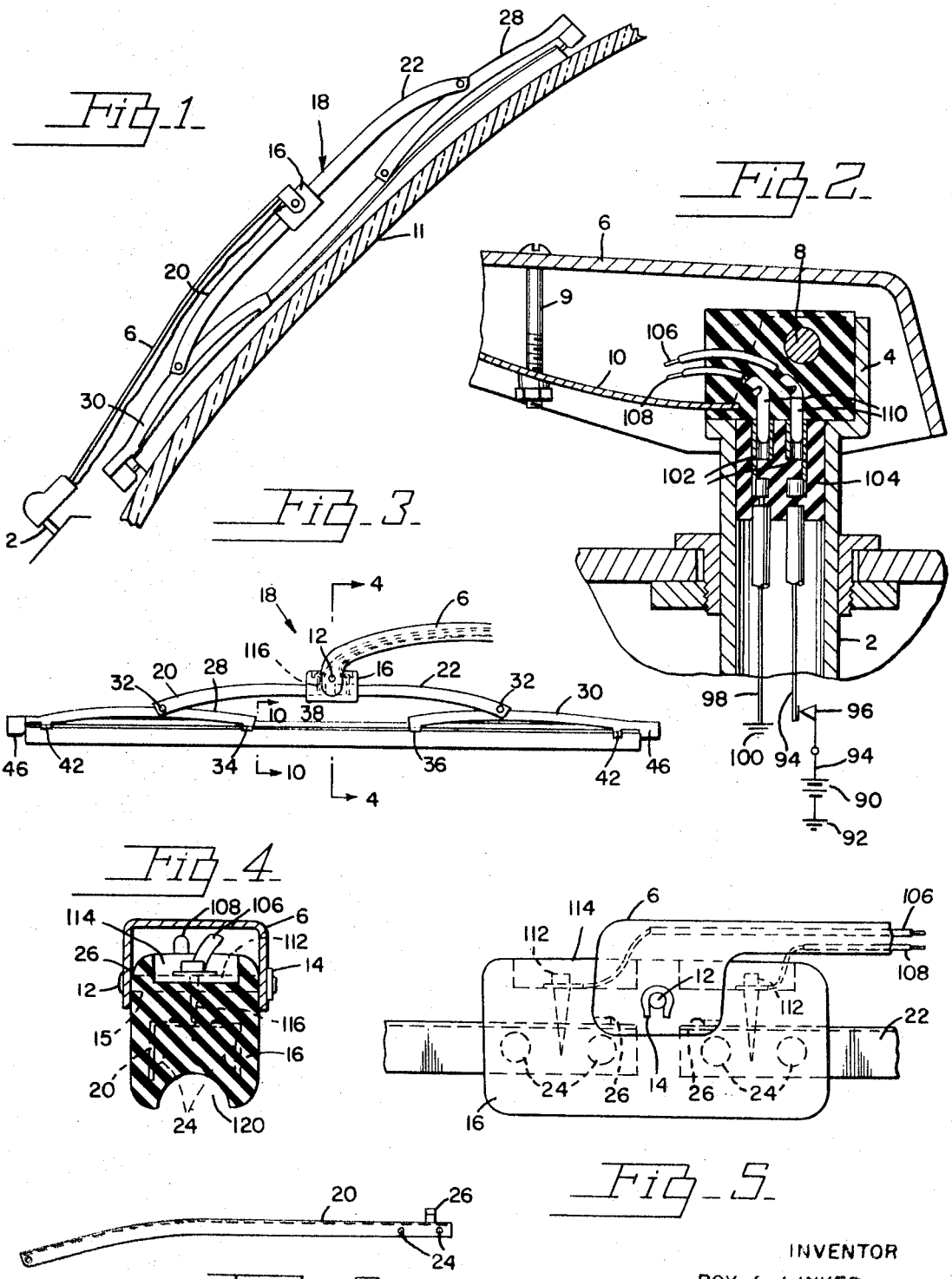

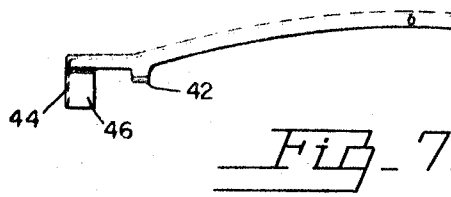
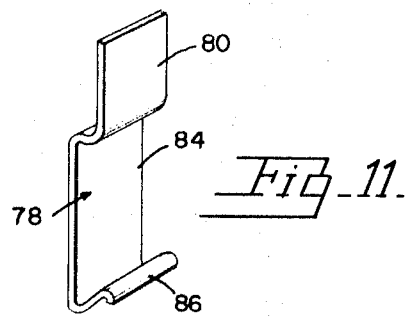
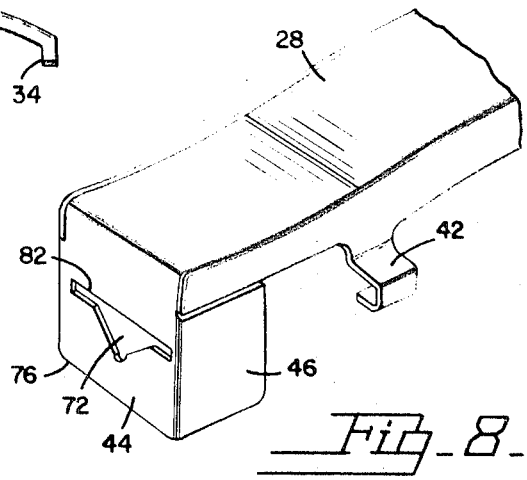
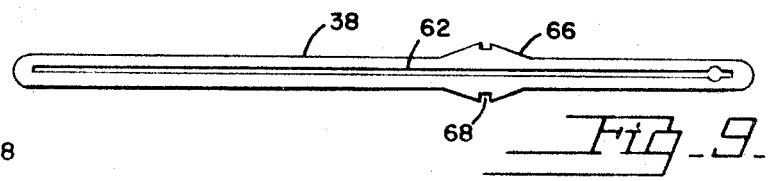
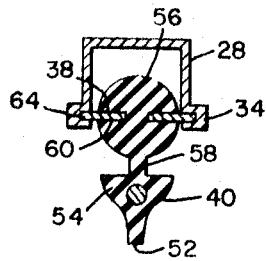
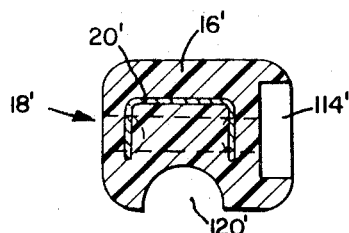
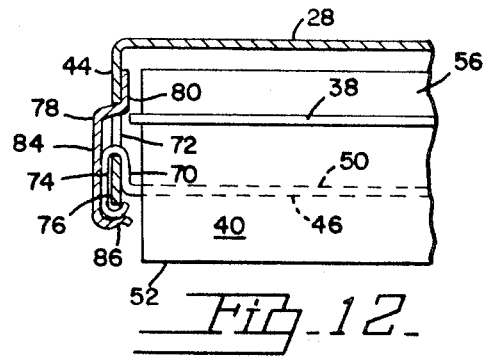
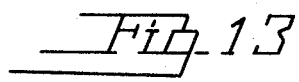
INVENTOR
ROY E. LINKER
BY Sperry and Zoda
ATTORNEYS 3,587,129

ELECTRICALLY HEATED WINDSHIELD WIPER ASSEMBLY

This application is a continuation-in-part of copending application Ser. No. 573,109.

FIELD OF INVENTION

The invention is directed to windshield wiper assemblies embodying a flexible wiping blade provided with an electrical resistance element for raising the temperature of the wiping element to aid in melting ice and snow which may accumulate on the windshield of an automobile, truck, aircraft or other vehicle. Since it is necessary from time to time to replace the windshield wiping blade or the mounting means, or both, it is necessary at the same time to disconnect the electrical resistance element and the mounting means from the electrical circuit used to energize the electrical resistance element. For this purpose the present invention provides novel means for establishing and disconnecting the electrical contacts between the current supplying circuit and the mounting means, resistance elements and the like with a minimum of difficulty and expense. Connection between the electrical circuit and the mounting means may be established at a point adjacent the oscillating shaft by which the arm of the windshield wiper assembly is actuated to permit ready removal or replacement of the arm when desired. Other or additional connections may be established between the arm and blade mounting means to permit removal and replacement of such mounting means without resorting to removal or disconnection of the arm from the electrical circuit. In addition, the assembly is provided with separable connecting means for securing the wiper blade and backing means therefor to the mounting means whereby the blade and its backing may be removed from the mounting means for replacement of the blade without disturbing or disconnecting the remaining elements of the assembly.

These advantages are attained by providing novel types of members and combinations of the various elements of the assembly exemplified by the constructions illustrated in the drawings an described herein.

THE DRAWINGS

FIG. 1 is a side elevation illustrating a typical windshield wiper assembly embodying the present invention;

FIG. 2 is a sectional view through the oscillating shaft and a portion of the arm of the assembly illustrated in FIG. 1;

FIG. 3 is a side elevation of a typical yoke and blade mounting means embodying the present invention;

FIG. 4 is a transverse sectional view through the construction of FIG. 3 taken on the line 4—4 thereof;

FIG. 5 is a side elevation of the connection between the arm and mounting means shown in FIGS. 3 and 4;

FIG. 6 is a side elevation illustrating a form of yoke member employed in construction of FIG. 3;

FIG. 7 is side elevation illustrating a preferred type of blade supporting member embodying the present invention;

FIG. 8 is an enlarged view of the outer end of the blade mounting member of FIG. 7;

FIG. 9 is a plan view of a backing strip employed in the practice of the present invention;

FIG. 10 is a transverse sectional view of the windshield wiper blade and assembly taken on the line 10—10 of FIG. 3;

FIG. 11 is a perspective illustrating a clip adapted for use with the blade mounting member of FIGS. 7 and 8;

FIG. 12 is a longitudinal sectional view through the assembly of FIG. 10; and

FIG. 13 is a sectional view similar to FIG. 4 illustrating an alternative construction embodying the present invention.

PREFERRED EMBODIMENTS OF THE INVENTION

In that form of the invention chosen for purpose of illustration in the drawings the windshield wiper assembly includes an oscillating shaft 2 which may be rocked back and forth in the usual manner by any suitable means (not shown). The shaft 2 has a head 4 on the outer end thereof, to which an actuating arm 6 is pivotally connected by a pin 8 or the like. A leaf spring 10 connected to the head 4 and to the actuating arm 6 is placed under tension of a screw of the like 9 to urge the free end of the arm 6 toward the surface of the windshield 11 to be wiped. The outer end of the actuating arm 6 is generally U-shaped in cross section and a pivot pin 12 passes through the opposite sides of the arm and is removably held in place by a spring clip member 14.

The pivot pin 12 extends through a transverse hole 15 formed in a central mounting member 16 of a yoke 18. The yoke 18 includes two metallic members 20 and 22 which are fixedly secured to the central mounting member 16 and extend in opposite directions therefrom. The mounting member 16 also serves to electrically insulate the metal members 20 and 22 from each other and for this purpose the mounting member 16 is formed of a molded electrically insulating plastic material in which the adjacent inner ends of the members 20 and 22 are embedded prior to the molding operation. Depressions 24 are formed in the inner ends of the members 20 and 22 to aid in anchoring the members fixedly in place and in some instances the inner ends of the members 20 and 22 may further be provided with a deformable raised portion 26 for receiving and retaining an electrical conductor when the end of such conductors are also embedded in the plastic material of the mounting member 16 prior to molding thereof.

Blade supporting members 28 and 30 are pivotally connected near the midpoints thereof and the opposite outer ends of the members 20 and 22 of yoke 18 by means of pivot pins 32. The blade supporting members also are formed of metal and may be generally U-shaped in cross section as shown in FIG. 10. The inner end of each of the blade supporting members 28 and 30 is formed with inwardly facing channel shaped extensions 34 and 36 respectively, which project downwardly from the supporting members in position to receive and embrace the opposite sides of a backing strip 38 carried by the wiper blade 40. Similar backer receiving channel shaped extensions 42 project downwardly from the members 28 and 30 near the outer ends of said members but are located a short distance inward from the downwardly turned end closing portions 44 on the opposite outer ends of the mounting members. The end closing portions 44 of the mounting members 28 and 30 have wings 46 at the opposite sides thereof for housing the opposite ends of the wiper blade 40 so as to protect the projecting ends 70 of the electrical resistance element 50 by which the blade 40 is heated.

The wiper blade 40 is preferably of the extruded character disclosed in U.S. Pat. No. 3,201,818 and as shown is provided with a narrow wiping edge 52 and an upward and outwardly tapering body 54. The body of the wiper blade is connected to the head 56 of the blade by a narrow flexible neck 58 which serves to permit the body 54 and wiping edge 52 of the blade to swing back and forth as the blade is oscillated during operation thereof.

The opposite sides of the head 56 of blade 40 are provided with opposite inwardly extending grooves 60 which extend the entire length of the blade. The backing strip 38 is slotted at 62 throughout the greater portion of the length of the strip so that the portions of the strip at opposite sides of the slot 62 may be received in the grooves 60 on the opposite sides of the head 56 of the wiper blade. On the other hand, the backing strip 38 is of greater width than the head 56 of the wiper blade so that its opposite outer edges 64 protrude beyond the sides of the head 56 of the wiper blade so as to be received within the inwardly facing channel shaped extensions 34, 36 and 42 near the opposite ends of the blade supporting members 28 and 30 of the assembly.

The backing strip 38 is formed of electrically insulating material and for this purpose may be made from nylon or other fabric material impregnated with or embedded within an electrically insulating resinous material. The backing strip thus formed is flexible in a plane normal to the surface to be wiped so as to permit it to conform to the curved surface of a windshield when it is urged toward the windshield by the actuating arm 6, yoke 18 and blade supporting members 28 and 30. At the same time the backing strip 38 is relatively stiff or inflexible in a direction parallel to the surface of the windshield so that the blade 40 will not be distorted longitudinally during the movement thereof back and forth across the windshield.

Further, in order to enable the wiper blade 40 and backing strip 38 to move longitudinally with respect to the blade mounting member 28 and 30 so as to conform more readily to this curvature of a windshield, the backing strip 38 is formed with a portion 66 of increased width having notches 68 in the opposite sides thereof. The inturned channel projections 34 on the inner end of the blade supporting member 28 fit into the notches 68 so as to positively engage the backing strip 38. However, the inturned channel projections 36 on the inner end of the blade supporting member 30 and the inturned channel projections 42 near the outer ends of the members 28 and 30 have a loose sliding engagement with the laterally protruding edges 64 of the backing strip 38. The backing strip and blade 40 are thus positively connected to the blade supporting members while being movable with respect thereto to afford the necessary longitudinal bending of the blade and adjustment in the position thereof to assure effective wiping of either a flat or progressively curving windshield surface.

The windshield wiping blade 40 employed in the practice of the present invention has an electrical resistance element 50 carried thereby. The ends 70 of the resistance element 50 project from the opposite ends of the blade 40 and are electrically connected to the end closing portions 44 at the opposite outer ends of the blade supporting members 28 and 30. For this purpose uninsulated portions of the projecting ends 70 of the resistance element 50 at opposite ends of the blade 40 are passed outward through the opening 72 in the closing portion 44 at the outer end of each of the blade supporting members 28 and 30. The ends 70 are then passed downward at 74 over the outer face of the end closing portion 44 and inward beneath the lower edge 76 of the portion 44. An attaching clip 78 is then applied to the end portion 44 to hold the end 74 of the resistance wire firmly in place and to establish a positive but separable electrical connection between the resistance 50 and the metallic blade supporting members 28 and 30. The attaching clip 78 illustrated in FIG. 11 has an upwardly and inwardly extending tongue 80 movable through the transverse slotted portion 82 of the opening 72 in end closing portion 44 of the members 28 and 30. The body 84 of the clip 78 extends downwardly from the tongue 80 over the uninsulated portion 74 of the projecting end 70 of the resistance element 50 and the lower edge 86 of the clip is in the form of an upwardly arched spring means which is snapped inward past the lower edge 76 of the end portion 44 and the portion of the extension 74 which passes upward beneath the edge 76. In this way the clips 78 serves to positively hold the extensions 74 of the resistance element in electrical contact with the end portions 44 at the outer ends of the blade holding members 28 and 30 while projecting said extensions from exposure or contact with windshield wiping cloths or other objects which might otherwise come in contact therewith. At the same time the clips 78 may be removed from the blade holding member when it is necessary to remove the blade 40 from said members for replacement by a new blade.

In order to energize the resistance element 50 to cause the temperature of the blade 40 to be raised for melting ice or snow windshield, the windshield, a source of electrical current 90 is provided. One side of said current source may be connected to ground on the vehicle body or elsewhere as indicated at 92, whereas a wire 94 is connected to the opposite side of the current source. A switch or rheostat 96 may be connected to the wire 94 and current source 90 to control the supply of current to the resistance element 50 as desired. A second wire 98 is connected at one side to ground at 100 and both of the wires 94 and 98 may extend through the oscillating shaft 2 or elsewhere to the female elements 102 of a separable connector 104 which may be mounted on or adjacent the outer end of the shaft 2. Wires 106 and 108 are connected to the male elements 110 of the separable connector 104 and extend through the actuating arm 6 to the mounting member 16 of the yoke 18. The wires 106 and 108 may be electrically connected to the members 20 and 22 respectively of the yoke 18 and for this purpose, as indicated above, the ends of the wires may be inserted beneath the deformable raised portions 26 near the inner ends of the members 20 and 22 so as to be secured thereto prior to the molding of the mounting member 16. The ends of the wires 106 and 108 will then be embedded in the molded plastic establishing a permanent connection with the members 20 and 22. However, as shown in FIGS. 4 and 5 the ends of the wires 106 and 108 may be provided with eyelet members 112 adopted to be housed within depressions 114 in the molded mounting member 16. Self-tapping screws 116 may then be passed through the eyelets 112 and the molded material of the mounting member 16 into positive electrical contact with the embedded portions of the members 20 and 22 of yoke 18. In this way the wires 106 and 108 may be separably connected to the members 20 and 22 whereby they may be detached from the mounting member 16 and member 20 and 22 when it is desired to replace or remove the yoke 18 from the actuating arm 6.

The construction thus provided serves to provide a controllable circuit for energizing the heating element 50 of the wiper blade 40. Thus, when switch 96 is closed, current will flow from the source 90 through wire 94, female connector 102 and male connector 110 of the separable connector 104 to wire 106 mounted in the actuating arm 6. From wire 106 current flows to the member 20 of yoke 18 through connection 26, or the self-tapping screw 116, and then flows through the pivotal connecting means or pivot pin 32 to the blade supporting member 28 and end portion 44 to the extension 76 and 70 at one end of the resistance element 50. From the opposite end of the heating element 50 current returns through end portion 44 of blade supporting member 30 to yoke member 22 and the self-tapping screw 116 or connection 26 to wire 108. The wire 108 then carries current to the separable connector 104 on shaft 2 and wire 98 to ground 100 or the opposite side of current source 90.

At the same time the assembly renders it possible to readily disconnect the blade 40 and its resistance element 50 from the assembly for replacement or substitution of a new blade without disassembling other elements of the assembly. If it is desired to remove or substitute either or both of the blade supporting members 28 or 30 this may be readily accomplished by removal of the hinge pins 32 by which they are attached to the members 20 and 22 of yoke 18. In a similar way the yoke 18 and the elements supported thereby may be separated from the actuating arm 6 by removal of the pivot pin 12 and self-tapping screws 116 leaving the wires 106 and 108 in position in the actuating arm 6. Finally, of course, the wires 106 and 108 may be disconnected from the wires 94 and 98 which pass through the oscillating shaft 2 by separating the male and female elements of the separable connector 104 in order to permit the arm 6 and remaining elements of the assembly to be removed or replaced as may be required without removing or manipulating the oscillating shaft 2. Accordingly, the assembly provided is capable of easy repair or replacement of any of the elements thereof as may be needed for any purpose.

The present invention is not limited in its construction and operation to the particular form and embodiments thereof described above. Thus as shown in FIG. 13, the mounting member 16' of the yoke 18' may be formed to extend laterally from the arm 6' of the assembly as is usual in "concealed" windshield wiper assemblies. Furthermore, the mounting member 16 in either or both forms of the invention shown may be provided with a concave groove or channel 120 on the side thereof facing the windshield wiper blade to provide space for the head 56 of the wiper blade when the yoke 18 is urged toward the windshield as the blade moves over a flat or other surface. The overall height of the assembly can be reduced and the influence of wind blowing across the windshield will be minimized.

I claim:

1. A windshield wiper assembly comprising an oscillating shaft, an actuating arm connected at one end to said shaft for moving the arm back and forth over a windshield, the opposite end of said arm having a yoke connected thereto and embodying a mounting member together with metallic members which are electrically insulated from each other, blade supporting members formed of electrically conducting material pivotally and electrically connected to the metallic members of said yoke, a windshield wiper blade having a wiping edge and a portion extending parallel to said wiping edge provided with longitudinally extending slots in opposite sides thereof, a backing strip formed of electrically insulating material extending throughout substantially the entire length of the blade and detachably received in said slots, said blade supporting members having extensions thereon and said backing strip being engaged by the extensions on said wiper blade and to said supporting members to connect the blade to the blade supporting members, said wiper blade having an electrical resistance element carried thereby, and means for establishing an electrical circuit including said metallic members, blade supporting members and electrical resistance element for raising the temperature of the windshield wiper blade.

2. A windshield wiper assembly as defined in claim 1 wherein said backing strip presents opposite edges which project outwardly on opposite sides of the wiper blade and said blade supporting members are provided with channel forming elements which embrace the projecting edges of said backing strip 3. A windshield wiper assembly as defined in claim 2 wherein said backing strip and blade are movable longitudinally with respect to at least a portion of the channel forming elements on the blade supporting members.

4. A windshield wiper assembly as defined in claim 2 wherein the backing strip is formed with notches in the opposite outer edges thereof and at least one pair of the channel forming elements on the blade supporting members extend into said notches and serve to prevent longitudinal movement of the backing strip with respect to said pair of channel forming elements.

5. A windshield wiper assembly as defined in claim 1 wherein said electrical circuit includes a separable connection for permitting separation of at least one element of the assembly from other elements of the assembly without disconnecting said other elements of the assembly.

6. A windshield wiper assembly as defined in claim 1 wherein the opposite ends of the electrical resistance element are separably connected to the blade supporting members at spaced points thereon to permit removal and replacement of the wiper blade and resistance element without disconnecting said other members of the assembly.

7. A windshield wiper assembly as defined in claim 1 wherein uninsulated electrical connections extend from the electrical resistance element to the blade supporting members, and means are provided for at least partially enclosing said uninsulated connections.

8. A windshield wiper assembly as defined in claim wherein electrical connections extend from said electrical resistance element to said blade supporting members and a clip on at least one of said blade supporting members covers one of said electrical connections.

9. The combination comprising a windshield wiper blade having an electrical heating element carried thereby, said blade being provided with a body portion presenting a wiping edge and a head portion connected to the body portion and having longitudinally extending slots in opposite sides thereof, an electrically insulating backing strip detachably received within the slots in the head portion of the wiper blade and presenting portions which project outwardly beyond the sides of the head portion of the blade, said backing strip being provided with outwardly facing notches in the outwardly projecting portions thereof, electrically conducting blade supporting means having elements thereof positioned within the notches in the backing member and serving to prevent longitudinal movement of the backing member and blade with respect to said supporting means, and electrically conducting means connecting said supporting means to said electrical heating element.